United States Patent
Gershtein et al.

(10) Patent No.: US 6,651,703 B2
(45) Date of Patent: Nov. 25, 2003

(54) TRANSPORTATION AND STORAGE OF ULTRA-HIGH PURITY PRODUCTS

(75) Inventors: Vladimir Yliy Gershtein, Allentown, PA (US); Robert William Ford, Schnecksville, PA (US); Christopher R. Butler, Allentown, PA (US); Eugene Y. Ngai, Whitehouse Station, NJ (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/101,340

(22) Filed: Mar. 19, 2002

(65) Prior Publication Data

US 2003/0178093 A1 Sep. 25, 2003

(51) Int. Cl.$^7$ .................................................. B65B 1/04
(52) U.S. Cl. ........................ 141/64; 141/311 A; 141/86; 137/350; 220/1.5
(58) Field of Search ................................. 141/311 A, 86, 141/64, 65, 66, 231; 220/1.5, 4.12, 661; 137/588, 347, 350

(56) References Cited

U.S. PATENT DOCUMENTS

| | | | | |
|---|---|---|---|---|
| 4,685,327 A | | 8/1987 | Sharp ........................ 73/49.2 |
| 4,958,957 A | | 9/1990 | Berg et al. ..................... 405/55 |
| 5,016,689 A | | 5/1991 | McGarvey et al. ......... 141/198 |
| 5,071,166 A | | 12/1991 | Marino ........................ 280/230 |
| 5,188,252 A | * | 2/1993 | Gerhard ....................... 220/1.5 |
| 5,211,202 A | * | 5/1993 | Zink et al. ................... 137/350 |
| 5,996,827 A | * | 12/1999 | Splane ........................ 220/1.5 |

FOREIGN PATENT DOCUMENTS

| | | | | |
|---|---|---|---|---|
| EP | 0624752 | 1/1996 | ............. | F17C/1/00 |
| EP | 0969242 | 1/2000 | ............. | F17C/1/00 |
| EP | 0969243 | 1/2000 | ............. | F17C/1/00 |
| WO | 98/57096 | 12/1998 | ........... | F17C/13/06 |

OTHER PUBLICATIONS

Chlorine Institute Emergency Kit "C", Chlorine Institute catalog "Chlorine Safety and Hazmat Emergency Equipment", section "C–Kit Design Features". Can also be found on the web site (No date). http://www.chlorinesafety.com/clequip.htm.

* cited by examiner

*Primary Examiner*—Steven O. Douglas
(74) *Attorney, Agent, or Firm*—John M. Fernbacher

(57) ABSTRACT

A system for the transportation and storage of a product comprising a tank including a cylindrical wall section and two ends which define a cylindrical tank periphery, wherein the tank periphery has an interior and an exterior; a recessed valve box including one or more side walls, a bottom wall, and a removable, sealable top cover which can be attached to the one or more side walls to seal the valve box, wherein the valve box side walls are sealably joined to the cylindrical wall section such that the valve box extends through the cylindrical wall section into the interior of the tank periphery and is partially or totally disposed in the interior of the tank periphery; and one or more valves disposed in the valve box. Each valve has a first and a second end, wherein each first end may be connected to a pipe which passes through a wall of the valve box for introducing product into the tank or withdrawing product from the tank, wherein the valves are disposed partially or totally within the tank periphery, and wherein the tank has a rigid framework surrounding the tank and valve box, wherein the framework is attached to and supports the tank, and wherein the framework defines a periphery which encloses the periphery of the tank. The product in the tank can be isolated from the atmosphere surrounding the tank when the valves are closed.

21 Claims, 4 Drawing Sheets

TRANSPORTATION AND STORAGE OF ULTRA-HIGH PURITY PRODUCTS

BACKGROUND OF THE INVENTION

The safe transportation and storage of hazardous, high purity and ultra-high purity products are important in the manufacture of specialized components in the electronics and related industries. These transportation and storage procedures must meet all safety and environmental regulations set by government agencies in the countries and jurisdictions involved. In addition, transportation and storage methods must maintain the high and ultra-high purity requirements of the manufacturers that utilize these products.

Some of these products are used in moderate quantities and can be transported and stored in standard cylinders, for example, as compressed liquefied gases. As the demand for such high purity and ultra-high purity products grows, it becomes desirable to ship the products in larger, bulk containers which can be handled by standard modular shipping methods via truck, rail, ship, and air. As such containers become larger, the prevention of leaks and accidental emissions becomes correspondingly more important.

Modular transportation of these products in large volumes can be facilitated by mounting storage tanks within standard-sized structural frames which can be loaded and unloaded using standard cranes and lifts, and which can be shipped by standard modular shipping methods. It is desirable to maximize the volume of product in the tanks which are mounted in these standard-sized structural frames while meeting the safety, environmental, and product purity requirements associated with these shipping methods. These needs are met by the transportation and storage system of the present invention as described below and defined by the claims which follow.

BRIEF SUMMARY OF THE INVENTION

The invention relates to a system for the transportation and storage of a product, which system comprises a tank including cylindrical wall section and two ends, wherein the cylindrical wall section and two ends define a cylindrical tank periphery, and wherein the tank periphery has an interior and an exterior. The system includes a recessed valve box having one or more side walls, a bottom wall, and a removable, sealable top cover which can be attached to the one or more side walls to seal the valve box. The valve box side walls are sealably joined to the cylindrical wall section such that the valve box extends through the cylindrical wall section into the interior of the tank periphery and is partially or totally disposed in the interior of the tank periphery. The system includes one or more valves disposed in the valve box, wherein each valve has a first and a second end, wherein each first end is connected to a pipe which passes through a wall of the valve box for introducing product into the tank or withdrawing product from the tank. The system further includes a rigid framework surrounding the tank and valve box, wherein the framework is attached to and supports the tank, and wherein the framework defines a periphery that encloses the periphery of the tank. The product in the tank is isolated from the atmosphere surrounding the tank when the valve box is sealed.

The valve box cover, when attached to the one or more side walls of the valve box to form a sealed valve box, may be disposed at the tank periphery or exterior to the tank periphery. The sealed valve box is isolated from the atmosphere surrounding the tank.

The system may further comprise means for either (1) introducing pressurization gas into the sealed valve box or (2) introducing purge gas into the sealed valve box and withdrawing purge gas from the sealed valve box.

The valve box may be cylindrical with a circular bottom wall, a circular top cover, and a cylindrical center portion forming a single side wall. The maximum allowable working pressure of the tank may be less than or equal to about 500 psia. The maximum allowable working pressure of the valve box when sealed may be equal to or greater than the maximum allowable working pressure of the tank.

Each second end of the one or more valves may be connected to a sealable closure which can be connected to a fill line for introducing product into the tank from an external source, connected to a withdrawal line for withdrawing product from the tank for external use, or sealed closed for transportation or storage of the product in the tank. Each sealable closure typically is disposed in the valve box and within the tank periphery.

The tank may contain a product in coexisting liquid and vapor phases, wherein a fill line is adapted for introducing liquid into the tank and a withdrawal line is adapted for withdrawing vapor from the tank. The tank may contain a product selected from the group consisting of ammonia, chlorine, hydrogen chloride, trichlorosilane, silicon tetrachloride, and methyltrichlorosilane.

Alternatively, the tank may contain a solid particulate component and gas, wherein the fill line is adapted for introducing a mixture of the solid particulate component and gas into the tank and the withdrawal line is adapted for withdrawing a mixture of the solid particulate component and gas from the tank. In another alternative, the tank may contain a slurry of a solid particulate component and a liquid component, wherein the fill line is adapted for introducing a slurry of the solid particulate component and the liquid component into the tank and the withdrawal line is adapted for withdrawing a slurry of the solid particulate component and the liquid from the tank.

The axis of the tank may be generally horizontal. In this embodiment, the tank has a top and a bottom, the valve box is disposed in the top of the tank, and a pipe connected to the first end of a valve forms a dip tube which extends through and downward from the valve box to a location adjacent the bottom of the tank.

The invention also relates to a method for the transportation of a product, which method comprises:
(a) providing a system which comprises
(1) a tank including a cylindrical wall section and two ends, wherein the cylindrical wall section and two ends define a cylindrical tank periphery, and wherein the periphery has an interior and an exterior;
(2) a recessed valve box including one or more side walls, a bottom wall, and a removable and sealable top cover which can be attached to the one or more side walls to form a sealed valve box, wherein the valve box side walls are sealably joined to the cylindrical wall section such that the valve box extends through the cylindrical wall section into the interior of the tank periphery and is partially or totally disposed in the interior of the tank periphery;
(3) one or more valves disposed in the valve box, wherein each valve has a first and a second end, wherein each first end is connected to a pipe which passes through a wall of the valve box for introducing product into the tank or withdrawing product from the tank, wherein each second end is connected to a sealable closure, wherein the valves and sealable closures are disposed partially or totally within the tank periphery, and wherein product in the tank is isolated from the atmosphere surrounding the tank when the valve box is sealed; and (4) a rigid framework surrounding the tank and valve box, wherein the framework is attached to and supports the tank, and wherein the framework defines a periphery that encloses the periphery of the tank;

(b) at a first location, introducing product into the tank through at least one of the one or more valves, through a pipe connected to the first end of the valve, which pipe passes through the wall of the valve box and into the tank, and through a sealable closure connected to the second end of the valve;

(c) closing the one or more valves, sealing the sealable closure connected to each of the one or more valves, and attaching the sealable top cover to the one or more side walls of the valve box to seal the valve box;

(d) transporting the system from the first location to a second location; and (e) at the second location, removing the sealable top cover to open the valve box, opening the sealable closure attached to the second end of one of the one or more valves, and withdrawing the product from the tank through the valve and through a pipe connected to the first end of the valve, which pipe passes through the wall of the valve box and into the tank.

While transporting the system from the first location to the second location, pressurization gas may be introduced into the sealed valve box. Alternatively, purge gas may be introduced into the sealed valve box while purge gas is withdrawn from the sealed valve box.

In another embodiment, the invention relates to a method for the storage a product, which method comprises:

(a) providing a system which comprises (1) a tank including a cylindrical wall section and two ends, wherein the cylindrical wall section and two ends define a tank periphery, and wherein the periphery has an interior and an exterior;

(2) a recessed valve box including one or more side walls, a bottom wall, and a removable and sealable top cover which can be sealed to the one or more side walls to form a sealed valve box, wherein the valve box side walls are sealably joined to the cylindrical wall section such that the valve box extends through the cylindrical wall section into the interior of the tank periphery and is partially or totally disposed in the interior of the tank periphery;

(3) one or more valves disposed in the valve box, wherein each valve has a first end and a second end, wherein each first end is connected to a pipe which passes through a wall of the valve box for introducing product into the tank or withdrawing product from the tank, wherein each second end is connected to a sealable closure, wherein the valves and sealable closures are disposed partially or totally within the tank periphery, and wherein the product in the tank is isolated from the atmosphere surrounding the tank when the valve box is sealed; and (4) a rigid framework surrounding the tank and valve box, wherein the framework is attached to and supports the tank, and wherein the framework defines a periphery that encloses the periphery of the tank;

(b) introducing the product into the tank through at least one of the one or more valves, and through a pipe connected to the first end of any of the one or more valves, which pipe passes through the wall of the valve box and into the tank, and through a sealable closure connected to the second end of the valve; and (c) closing the one or more valves, sealing each sealable closure attached to the one or more valves, and attaching the sealable top cover to the one or more side walls of the valve box to seal the valve box.

The method may further comprise, after attaching the sealable top cover to seal the valve box, either (1) introducing pressurization gas into the sealed valve box or (2) introducing purge gas into the sealed valve box and withdrawing purge gas from the sealed valve box.

DETAILED DESCRIPTION OF THE INVENTION

The invention relates to a system and method for the transportation of products which must be isolated from the atmosphere and maintained in a state of high purity or ultra-high purity. These products may be environmentally harmful and in such cases isolation from the atmosphere is particularly important. The system can be adapted for modular transportation of these products in large volumes by mounting storage tanks within standard-sized structural frames. The system can be described as a bulk container which can be loaded, shipped, and unloaded using standard modular shipping methods via truck, rail, and ship.

Figure 1:
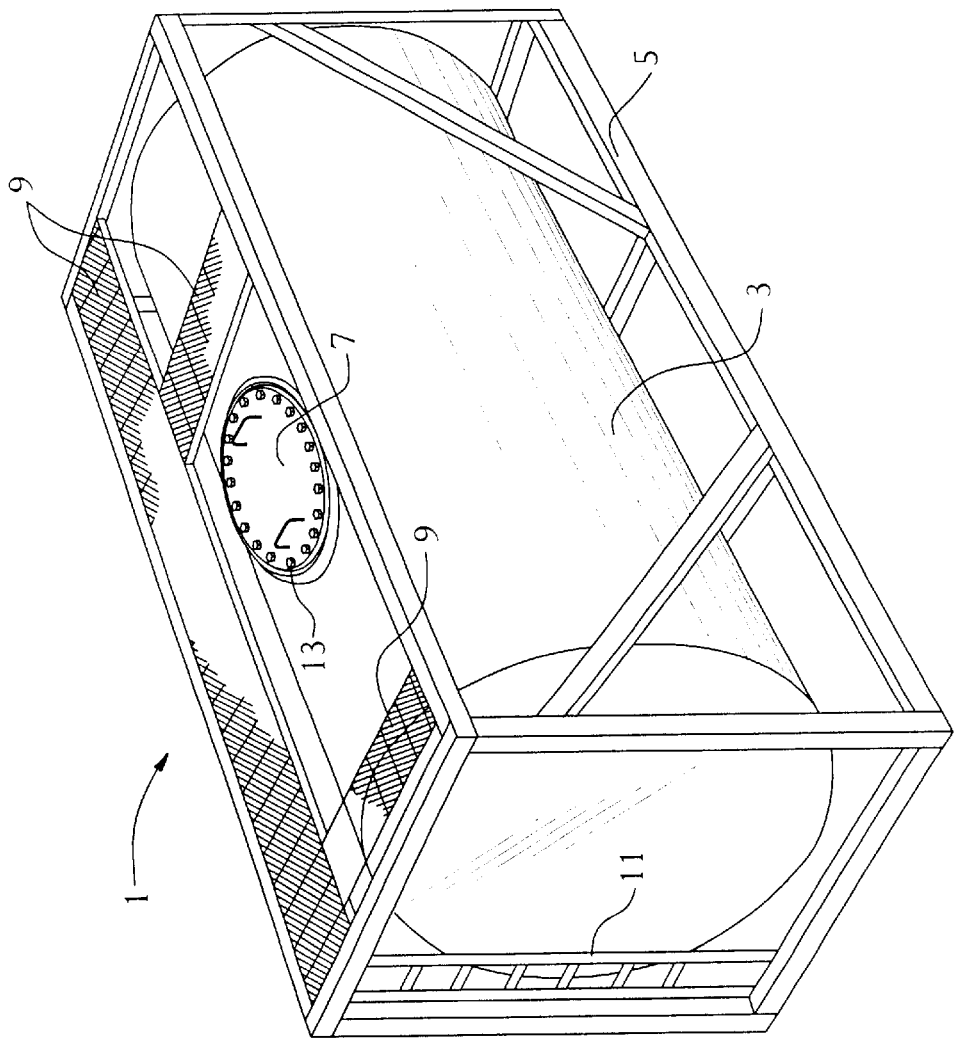
FIG. 1 is an isometric drawing of an exemplary modular transportation and storage system of the present invention.
Figure 2:
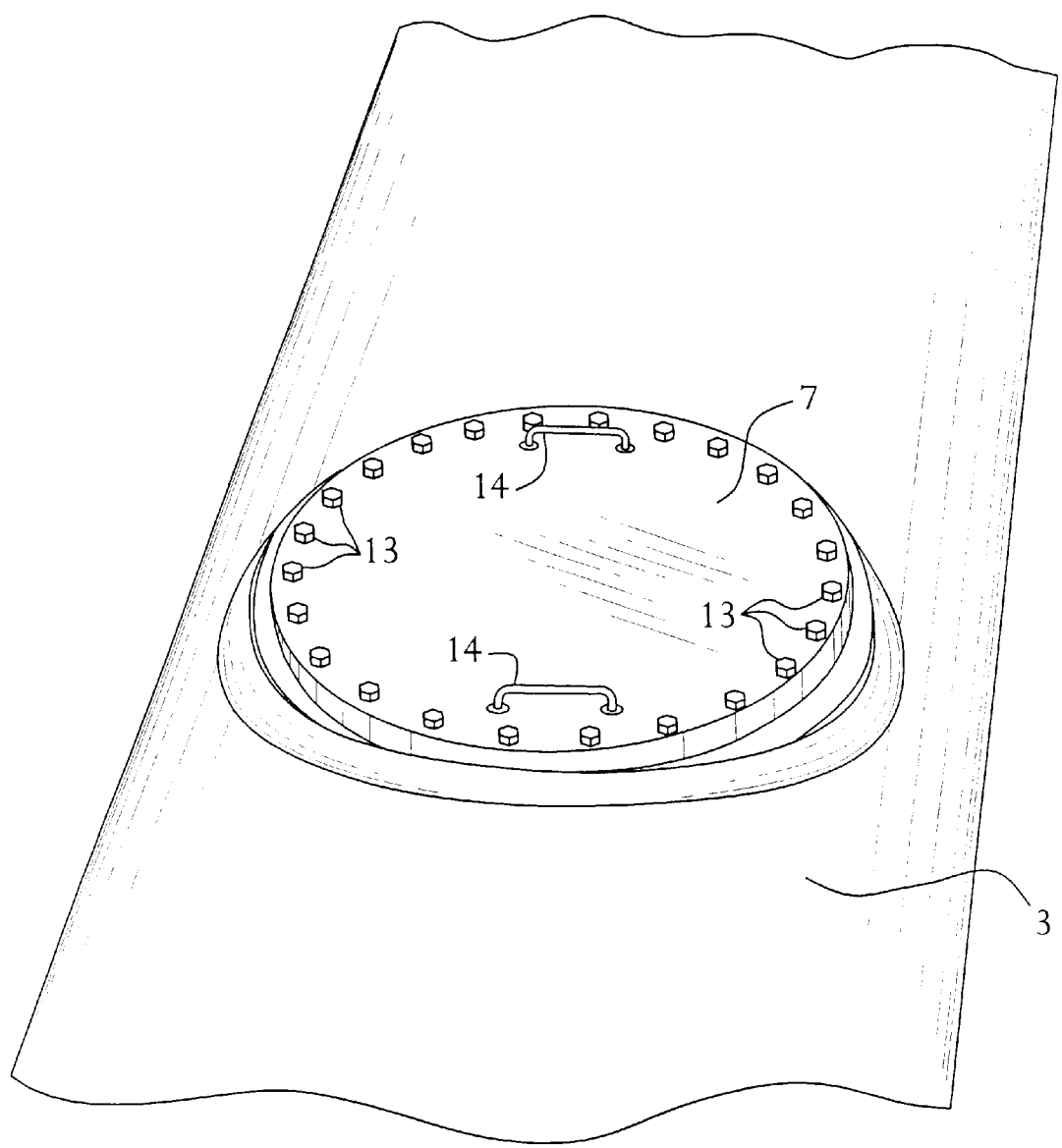
FIG. 2 is a partial view of the top portion of the system of FIG. 1.

Schematic isometric drawings of an exemplary embodiment of the invention are given in FIGS. 1 and 2. Modular tank and frame system 1 comprises tank assembly 3 mounted and fixed within structural framework 5 (FIG. 1) which is designed to support the tank assembly and allow safe loading, shipping and unloading by standard industry methods. Structural framework 5 may be fitted with lifting lugs or other attachments (not shown) which allow the entire system 1 to be lifted and moved during loading and unloading, as well as attached to transportation means such as truck trailers or rail cars.

Removable top cover 7 seals a valve box disposed within the periphery of framework 5 and disposed partially or completely within the periphery of tank assembly 3. Valves and sealable connections utilized for filling and withdrawal of product are located in the valve box as described later. Framework 5 may be fitted with catwalks 9 and ladder 11 for access to top cover 7. Modular tank and frame system 1 preferably is constructed using the specifications and standard dimensions required by government and shipping industry organizations such as the United States Department of Transportation (DOT) and the International Organization for Standardization (ISO). For example, the dimensions of modular tank and frame system 1 as defined by the periphery of framework 5 may be in accordance with the ISO standard shipping container dimensions of 20 ft×8 ft×8 ft 6 in high.

The use of top cover 7 and the valve box disposed within the periphery of framework 5 allows modular tank and frame system 1 to meet all safety and environmental regulations set by government agencies in the countries and jurisdictions involved. In addition, it ensures that high and ultra-high purity product requirements are met during both transportation and storage of modular tank and frame system 1.

Modular tank and frame system 1 should be fabricated using methods and materials specified by the appropriate government and shipping industry organizations. Tank 3 should be fabricated of appropriate known alloys to ensure both corrosion resistance and product purity requirements, and optionally may be lined with appropriate materials to meet these requirements. The maximum allowable working pressure of tank 3 as defined by the American Society of Mechanical Engineers (ASME) or the United States Department of Transportation (DOT) may be as high as 500 psia.

Top cover 7 is installed using appropriate gasket materials and a plurality of threaded bolts 13 around the periphery of the circular cover. This allows the valve box to be sealed during transportation and storage, and opened during filling and product withdrawal operations. Handles 14 (FIG. 2) allow cover 7 to be lifted and moved during tank opening and closing operations. Preferably, the maximum allowable working pressure of the valve box with top cover 7 installed and sealed is equal to or greater than the maximum allowable working pressure of tank 3. This ensures that any leakage of the valves or sealable connections within the valve box during transportation and storage is contained until tank and frame system 1 can be transported to a safe location for repair. If any damage to the valves or sealable connections occurs during filling or product withdrawal operations, top cover 7 can be installed and sealed immediately. When the maximum allowable working pressure of the valve box sealed by top cover 7 is equal to or greater than the maximum allowable working pressure of tank 3, tank and frame system 1 can be transported immediately to a safe location for repair without requiring an exemption from transportation authorities such as DOT.

Tank and frame system 1 can be utilized to transport and store a wide variety of products, wherein a product may be defined as a fluid or a flowable material which comprises one or more components present in two or more coexisting phases. In one embodiment, the system may be used for pressurized liquefied gases such as ammonia, chlorine, hydrogen chloride, trichlorosilane, silicon tetrachloride, and methyltrichlorosilane. In this application, product may be loaded into tank 3 as a liquid and later withdrawn as a vapor while the liquid vaporizes in the tank. Alternatively, liquid could be transferred to another tank under pressure in a transfill operation.

In another embodiment, the tank may be used for a solid particulate component which is introduced into the tank and withdrawn from the tank as a gas-solid suspension. Examples of such solid particulates may include graphite, carbon, and powdered metals, and the gas may be selected from air, nitrogen, argon, and natural gas. In yet another embodiment, the tank may be used for a slurry of a solid particulate component in a liquid component.

Figure 3:
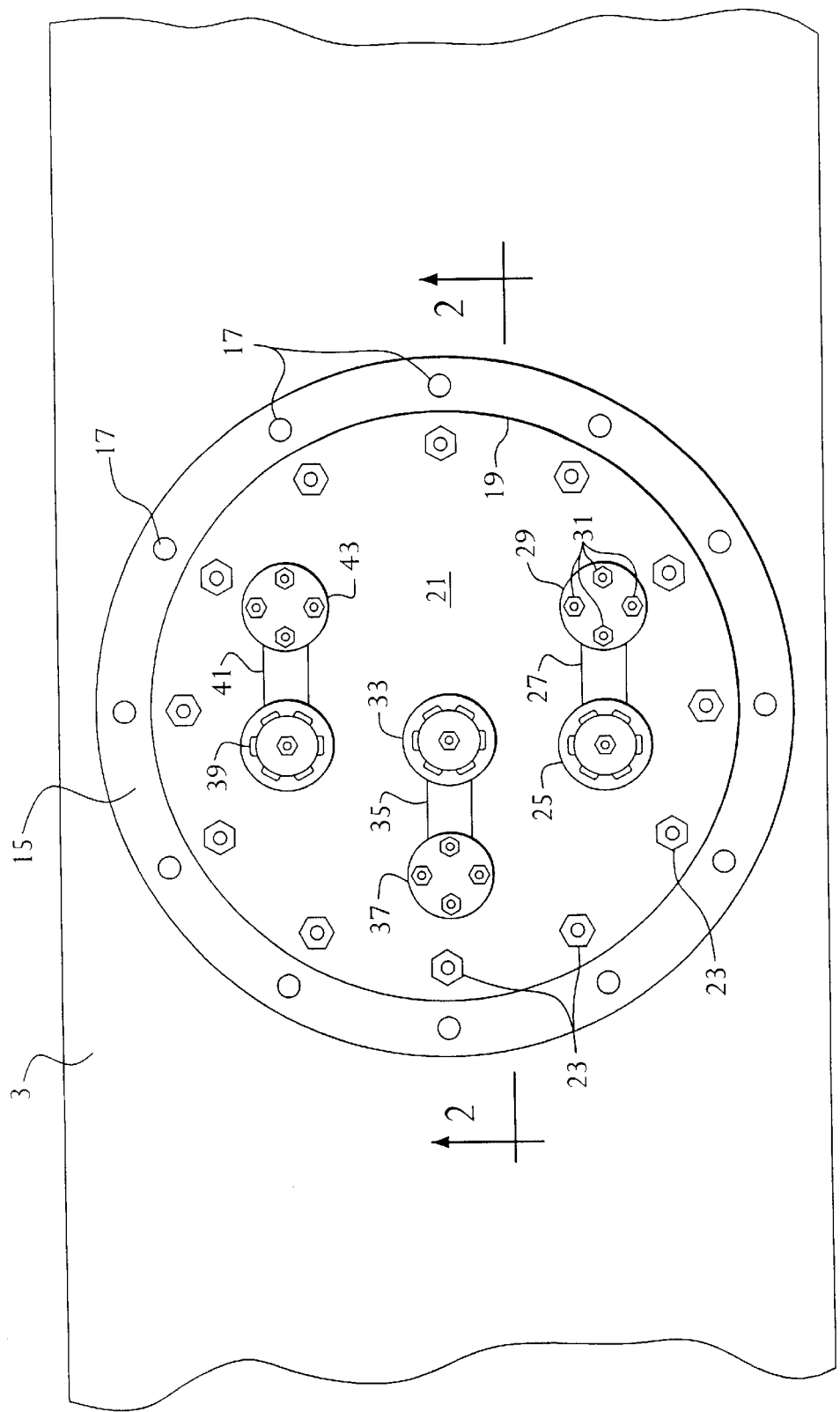
FIG. 3 is a top view of an exemplary recessed valve box which may be mounted in the system of FIG. 1.

A top view of the valve box with top cover 7 removed is illustrated in one embodiment as shown in FIG. 3. Flange or flange section 15 typically is welded to the upper wall area of tank 3 to form an integral part of the tank assembly. A plurality of threaded bolt holes 17 may be formed in the flange to receive threaded bolts 13 (FIGS. 1 and 2) which seal top cover 7 to the flange when the valve box is sealed. Other types of closures may be used as long as these closures are located within the periphery of framework 5.

Figure 4:
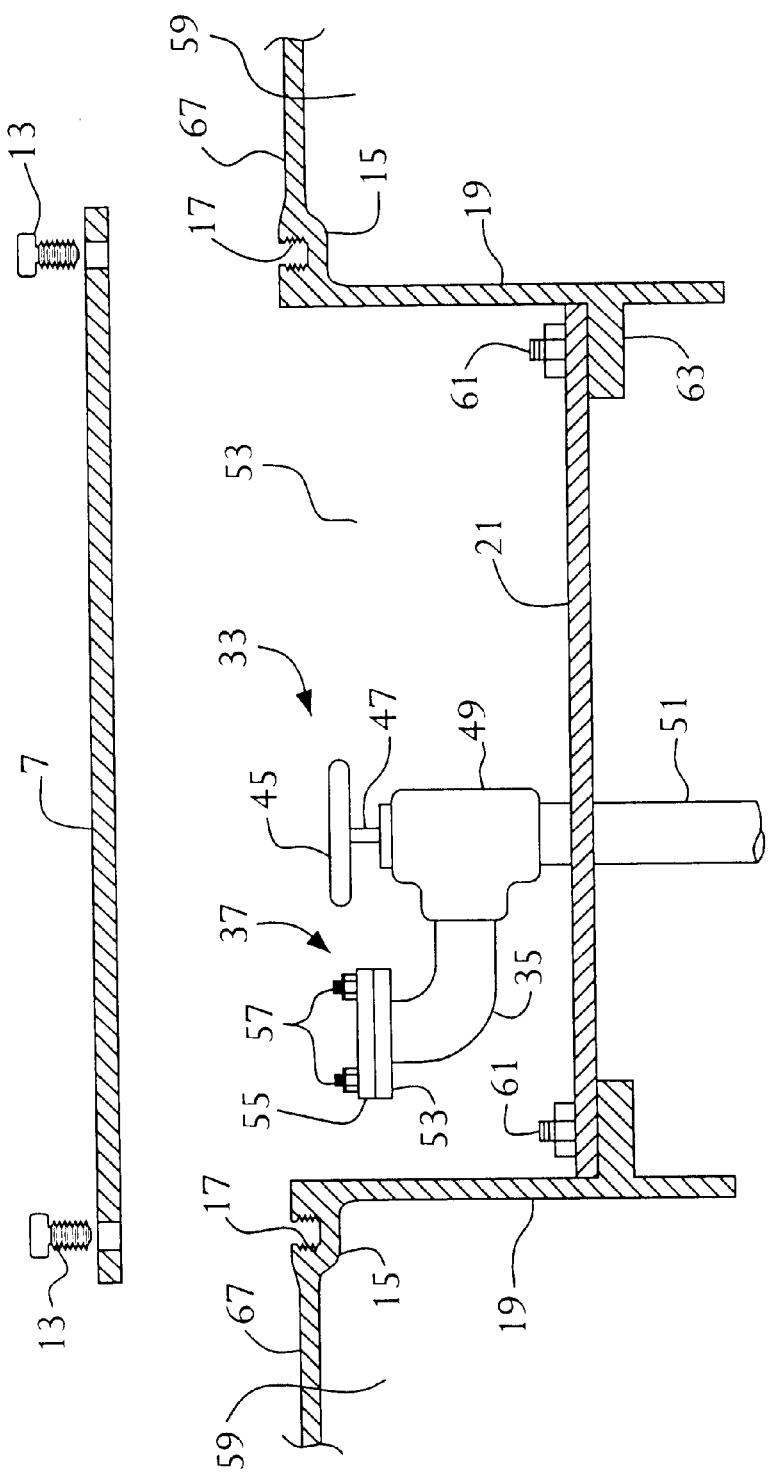
FIG. 4 is a section of FIG. 3 showing an exemplary valve and sealable closure assembly installation.

The interior of the valve box is defined by cylindrical side wall 19 and bottom wall 21 as shown in FIG. 4. Bottom wall 21 may be attached by plurality of bolts 23 (FIG. 3) to a circular bracket or ring (described later) which is part of side wall 19. Valve 25 typically comprises a handwheel (which is seen in this top view), a valve body which is located below the handwheel (and is not seen in this top view), and the usual valve internals including a valve stem, threads, packing, and seat. Alternatively, the valve may be operated by a pneumatic operator rather than a hand wheel. This valve may be a well-known type of valve described as an angle valve in which the two inlet/outlet ports define an included angle of 90 degrees. In this embodiment, one valve port is oriented downward and the other is oriented horizontally as described in more detail below. The horizontally-oriented valve port is connected to one end of pipe section 27 which is a short piece of pipe having a generally 90 degree bend. The other end of pipe section 27 is oriented upward and is connected to flange assembly or sealable closure 29. The downward-oriented port of valve 25 typically is connected to a section of pipe which passes through bottom wall 21 into the interior of tank 3. This section of pipe may be welded or flanged to bottom wall 21.

Alternatively, valve 25 may be a bellows-type valve and may be pneumatically operated. Valve configurations other than the angle configuration discussed above may be used with appropriate piping.

As shown, sealable closure 29 is sealed by a flange and gasket attached by flange bolts 31. When sealed, sealable closure 29 can withstand a maximum allowable working pressure equal to or greater than the maximum allowable working pressure of tank 3. When valve 25 and sealable closure 29 are open, product can be introduced therethrough into tank 3 or withdrawn therethrough from tank 3 by attaching appropriate fill and withdrawal lines to sealable closure 29. Additional and optional valve 33, pipe section 35, and sealable closure 37, which may be similar or identical to valve 25, pipe section 35, and sealable closure 29, respectively, also may be used for either product fill or product withdrawal. Additional and optional valve 39, pipe section 41, and sealable closure 43, which may be similar or identical to valve 25, pipe section 35, and sealable closure 29, respectively, also may be used for either product fill or product withdrawal. Typically, additional valves 33 and 39 each have a downward-oriented port connected to a section of pipe which passes through bottom wall 21 into the interior of tank 3, and this section of pipe is welded to bottom wall 21.

At least one valve is needed for fill and withdrawal of product from tank 3, but typically more than one valve is used. In one embodiment, the downward-oriented port of valve 33 may be connected to a section of pipe which passes downward through bottom wall 21 to a point near the bottom of the interior of tank 3. This section of pipe, known as a dip tube, may be used to introduce liquid into or withdraw liquid from the tank. Each of the downward-oriented ports of valves 25 and 39 may be connected to a piping assembly which passes downward through bottom wall 21 and into the upper portion of tank 33. This embodiment can be used, for example, when the product is a pressurized liquefied gas. In this example, the tank is filled with liquid through sealable closure 37, pipe segment 35, valve 33, and the section of pipe which passes downward through bottom wall 21 to a point near the bottom of the interior of tank 3. Vapor product is withdrawn from the tank through either or both of the sealable closures 31 and 43, pipe segments 27 and 41, valves 25 and 39, and the piping assembly which passes downward through bottom wall 21 and into the upper portion of tank 3.

While the valve box described above with reference to FIGS. 1–4 has a circular cross section, other shapes may be used. For example, the valve box cross section may be square or rectangular if necessary to meet certain piping and valve design requirements.

The orientation of an exemplary valve, pipe segment, and sealable closure in the valve box is illustrated by section 2—2 of FIG. 4. This section is shown in FIG. 4 which includes valve 33, pipe segment 35, and sealable closure 37. Valve 39, pipe segment 41, and closure 43, which lie behind valve 33, pipe segment 35, and sealable closure 37, are not shown in FIG. 4 for the sake of clarity. Valve 33 includes hand wheel 45, stem 47, and valve body 49. As explained above, in one embodiment this is an angle valve with one port connected to pipe segment 51 which passes through and is welded or flanged to bottom wall 21 of valve box 53. The other port is connected to pipe segment earlier described. Sealable closure 37 comprises flange 53 which is welded to pipe segment 35, flange 55, bolts 57, and a gasket (not shown) between the flanges. Pipe segment 51 may extend downward to the bottom of tank 3 as a dip tube or alternatively may extend via any desired piping configuration into upper region 59 of tank 3 (FIG. 4). 38 As described above with reference to FIG. 3, additional and optional valve 25, pipe section 27, and sealable closure 29 described earlier may be similar to valve 33, pipe segment 35, and sealable closure 37. Likewise, additional and optional valve 39, pipe section 41, and sealable closure 43 may be similar to valve 33, pipe segment 35, and sealable closure 37. The assemblies of valves, pipe segments, and sealable closures are generally installed in relation to bottom wall 21 as shown in FIG. 4, but may be oriented in any direction relative to side wall 19. For example, as shown in FIG. 3, the assembly formed by valve 33, pipe section 35, and sealable closure 37 is oriented in one direction while the assemblies formed by valves 25 and 39, pipe sections 27 and 41, and sealable closures 31 and 43 are oriented in the opposite direction.

In the embodiment described above, pipe segment 51 (FIG. 4) extends downward to the bottom of tank 3 as a dip tube and the pipe segments connected to the downward-oriented ports of valves 25 and 39 extend via any desired piping configuration into upper region 59 of tank 3. In this embodiment, pipe segment 51 may be used for liquid product fill service and the pipe segments connected to the downward-oriented ports of valves 25 and 39 (FIG. 3), which extend via any desired piping configuration into upper region 59 of tank 3, may be used for vapor withdrawal service.

Valve 49 typically is fixed in place by virtue of pipe segment 51, which is welded or flanged to the valve and to bottom cover 21 of valve box 53. Bottom cover 21 may be connected to the internal structure of tank 3 by means of bolts 61 to ring 63 which is part of cylindrical side wall 19 as earlier described. An appropriate gasket (not shown) may be installed between bottom wall 21 and ring 33. Side wall 19 is joined to top wall 67 of tank 3 via flange section 15, and threaded bolt holes 17 are disposed in flange section 15 as earlier described.

Valve box 53 can be sealed by attaching top cover 7 to flange section 15 with a gasket between (not shown) and installing threaded bolts 13 into threaded bolt holes 17. When sealed, valve box 53 encloses the valves, pipe segments, and sealable closures described above. Thus valve box 53 when sealed serves three purposes—it protects the valves, pipe segments, and sealable closures from externally-caused mechanical damage; it isolates from the atmosphere any leaks which may occur in the valves, pipe segments, and sealable closures; and it prevents possible contamination of the product in the tank by back-diffusion of atmospheric contaminants.

The combination of the valves, sealable closures, and sealed top cover described above thus provides three levels of functional isolation between the product within tank 3 and the outer atmosphere. This significantly reduces the statistical probability of a product release to the atmosphere caused by mechanical failure during transportation or storage. In addition, the three levels of functional isolation between the product within tank 3 and the outer atmosphere significantly reduces the possibility of product contamination by back-diffusion of contaminants such as water or other atmospheric components.

Preferably, valve box 53 is disposed within the periphery of tank 3 such that all valves, pipe segments, and sealable closures are disposed within this periphery. Since the periphery of tank 3 is within the periphery of framework 5, all valves, pipe segments, and sealable closures would be disposed within the periphery of framework 5.

In order to eliminate any possibility of contamination by back-diffusion of contaminants such as water or other atmospheric components through the various seal components and into tank 3, valve box 53 may be pressurized or purged (not shown) after closure with a selected inert gas during transportation and storage operations.

In one embodiment, the transportation and storage system described above can be used for high purity (contaminants up to ppmv levels) or ultra-high purity (impurities up to ppbv levels) liquefied compressed gases. Ultra-high purity gases traditionally have been transported and stored using cylinders with capacities in the range of 0.4 to 500 liters. Because of the unique design of the transportation and storage system described herein, the system can be used to transport and store ultra-high purity gases in larger volumes. For example, when using the system described above with a standard ISO frame size of 20 ft×8 ft×8 ft 6 in, up to 710 cu ft of product can be shipped and stored. This is equivalent, for example, to about 20,000 pounds of ultra-high purity ammonia. In contrast, the largest available cylinder for this service would have a capacity of 16 cu ft.

EXAMPLE

The system illustrated in FIGS. 1–4 is constructed for the transportation and storage of high purity ammonia. Valve 33, pipe segment 35, and sealable closure 37 are designed for filling tank 3 with high purity liquid ammonia having a maximum water concentration of 1 ppmv. In this application, pipe segment 51 (FIG. 4) extends to the bottom of tank 3. Valve 25, pipe segment 27, and sealable closure 31 (FIG. 3) are designed for vapor withdrawal service, wherein the pipe segment attached to the downward-directed port of valve 25 extends through bottom wall 21 and is placed in direct flow communication with the vapor head space in the upper region 59 of tank 3. Likewise, valve 39, pipe segment 41, and sealable closure 43 (FIG. 3) are designed for vapor withdrawal service, and the pipe segment attached to the downward-directed port of valve 39 extends through bottom wall 21 and is placed in direct flow communication with the vapor space in the vapor head space in the upper region 59 of tank 3.

Top cover 7 and the top flanges of sealable closures 29, 37, and 43 are removed, valves 25, 33, and 39 are opened, and the tank is cleaned and purged in preparation for liquid loading. A liquid fill line is attached to closure 37 and liquid product is introduced into tank 3 to the desired level wherein the tank contains 25,000 pounds of product. Valves 25, 33, and 39 are closed, the fill line is disengaged, and the top flanges of sealable closures 29, 37, and 43 are installed and sealed. Top cover 7 is installed and sealed.

The system is transported to a consumer and stored at the consumer's location for a period of time. When the demand for product from the system begins, top cover 7 and the top flange of sealable closure 29 are removed, a product withdrawal line is attached to closure 29, and the line is purged to remove residual air. Valve 25 is opened to deliver vapor product via the product withdrawal line to final use. Valve 39, pipe segment 41, and sealable closure 43 are held in reserve for use if product demand increases beyond that supplied by valve 25 or in the event of a leak or failure in valve 25 and associated piping.

What is claimed is:

1. A system for the transportation and storage of a product, which system comprises:
   (a) a tank including cylindrical wall section and two ends, wherein the cylindrical wall section and two ends define a cylindrical tank periphery, and wherein the tank periphery has an interior and an exterior;
   (b) a recessed valve box including one or more side walls, a bottom wall, and a removable, sealable top cover which can be attached to the one or more side walls to seal the valve box, wherein the valve box side walls are sealably joined to the cylindrical wall section such that the valve box extends through the cylindrical wall section into the interior of the tank periphery and is partially or totally disposed in the interior of the tank periphery; and
   (c) one or more valves disposed in the valve box, wherein each valve has a first and a second end, wherein each first end is connected to a pipe which passes through a wall of the valve box for introducing product into the tank or withdrawing product from the tank; and
   (d) a rigid framework surrounding the tank and valve box, wherein the framework is attached to and supports the tank, and wherein the framework defines a periphery which encloses the periphery of the tank; wherein the product in the tank is isolated from the atmosphere surrounding the tank when the valve box is sealed.

2. The system of claim 1 wherein the valve box is disposed within the periphery of the rigid framework.

3. The system of claim 1 wherein the valve box cover, when attached to the one or more side walls of the valve box to form a sealed valve box, is disposed at the tank periphery or is exterior to the tank periphery.

4. The system of claim 3 wherein the sealed valve box is isolated from the atmosphere surrounding the tank.

5. The system of claim 4 which further comprises means for either (1) introducing pressurization gas into the sealed valve box or (2) introducing purge gas into the sealed valve box and withdrawing purge gas from the sealed valve box.

6. The system of claim 1 wherein the valve box is cylindrical and has a circular bottom wall, a circular top cover, and a cylindrical center portion forming a single side wall.

7. The system of claim 1 wherein the maximum allowable working pressure of the tank is less than or equal to about 500 psia.

8. The system of claim 7 wherein the maximum allowable working pressure of the valve box When sealed is equal to or greater than the maximum allowable working pressure of the tank.

9. The system of claim 1 wherein each second end of the one or more valves is connected to a sealable closure which can be connected to a fill line for introducing product into the tank from an external, source, connected to a withdrawal line for withdrawing product from the tank for external use, or sealed closed for transportation or storage of the product in the tank.

10. The system of claim 9 wherein each sealable closure is disposed in the valve box and within the tank periphery.

11. The system of claim 9 wherein the tank contains product in coexisting liquid and vapor phases, wherein a fill line is adapted for introducing liquid into the tank and a withdrawal line is adapted for withdrawing vapor from the tank.

12. The system of claim 11 wherein the tank contains a product selected from the group consisting of ammonia, chlorine, hydrogen chloride, trichlorosilane, silicon tetrachloride, and methyltrichlorosilane.

13. The system of claim 9 wherein the tank contains a solid particulate component and gas, wherein the fill line is adapted for introducing a mixture of the solid particulate component and gas into the tank and the withdrawal line is adapted for withdrawing a mixture of the solid particulate component and gas from the tank.

14. The system of claim 9 wherein the tank contains a slurry of a solid particulate component and a liquid component, wherein the fill line is adapted for introducing a slurry of the solid particulate component and the liquid component into the tank and the withdrawal line is adapted for withdrawing a slurry of the solid particulate component and the liquid from the tank.

15. The system of claim 1 wherein the axis of the tank is generally horizontal, the tank has a top and a bottom, the valve box is disposed in the top of the tank, and a pipe connected to the first end of a valve forms a dip tube which extends through and downward from the valve box to a location adjacent the bottom of the tank.

16. A method for the transportation of a product, which method comprises:
   (a) providing a system which comprises
      (1) a tank including a cylindrical wall section and two ends, wherein the cylindrical wall section and two ends define a cylindrical tank periphery, and wherein the periphery has an interior and an exterior;
      (2) a recessed valve box including one or more side walls, a bottom wall, and a removable and sealable top cover which can be attached to the one or more side walls to form a sealed valve box, wherein the valve box side walls are sealably joined to the cylindrical wall section such that the valve box extends through the cylindrical wall section into the interior of the tank periphery and is partially or totally disposed in the interior of the tank periphery;
      (3) one or more valves disposed in the valve box, wherein each valve has a first and a second end, wherein each first end is connected to a pipe which passes through a wall of the valve box for introducing product into the tank or withdrawing product from the tank, wherein each second end is connected to a sealable closure, wherein the valves and sealable closures are disposed partially or totally within the tank periphery, and wherein product in the tank is isolated from the atmosphere surrounding the tank when the valve box is sealed; and
      (4) a rigid framework surrounding the tank and valve box, wherein the framework is attached to and supports the tank, and wherein the framework defines a periphery which encloses the periphery of the tank;
   (b) at a first location, introducing product into the tank through at least one of the one or more valves, through a pipe connected to the first end of the valve, which pipe passes through the wall of the valve box and into the tank, and through a sealable closure connected to the second end of the valve;

(c) closing the one or more valves, sealing the sealable closure connected to each of the one or more valves, and attaching the sealable top cover to the one or more side walls of the valve, box to seal the valve box;

(d) transporting the system from the first location to a second location; and (e) at the second location, removing the sealable top cover to open the valve box, opening the sealable closure attached to the second end of one of the one or more valves, and withdrawing the product from the tank through the valve and through a pipe connected to the first end of the valve, which pipe passes through the wall of the valve box and into the tank.

17. The method of claim 16 wherein the valve box is disposed within the periphery of the rigid framework.

18. The method of claim 16 which further comprises, while transporting the system from the first location to the second location, either (1) introducing pressurization gas into the sealed valve box or (2) introducing purge gas into the sealed valve box and withdrawing purge gas from the sealed valve box.

19. A method for the storage a product, which method comprises:

(a) providing a system which comprises
   (1) a tank including a cylindrical wall section, and two ends, wherein the cylindrical wall section and two ends define a tank periphery, and wherein the periphery has an interior and an exterior;
   (2) a recessed valve box including one or more side walls, a bottom wall, and a removable and sealable top cover which can be sealed to the one or more side walls to form a sealed valve box, wherein the valve box side walls are sealably joined to the cylindrical wall section such that the valve box extends through the cylindrical wall section into the interior of the tank periphery and is partially or totally disposed in the interior of the tank periphery;
   (3) one or more valves disposed in the valve box, wherein each valve has a first end and a second end, wherein each first end is connected to a pipe which passes through a wall of the valve box for introducing product into the tank or withdrawing product from the tank, wherein each second end is connected to a sealable closure, wherein the valves and sealable closures are disposed partially or totally within the tank periphery, and wherein the product in the tank is isolated from the atmosphere surrounding the tank when the valve box is sealed; and
   (4) a rigid framework surrounding the tank and valve box, wherein the framework is attached to and supports the tank, and wherein the framework defines a periphery which encloses the periphery of the tank;

(b) introducing the product into the tank through at least one of the one or more valves, and through a pipe connected to the first end of any of the one or more valves, which pipe passes through the wall of the valve box and into the tank, and through a sealable closure connected to the second end of the valve; and (c) closing the one or more valves, sealing each sealable closure attached to the one or more valves, and attaching the sealable top cover to the one or more side walls of the valve box to seal the valve box.

20. The method of claim 19 wherein the valve box is disposed within the periphery of the rigid framework.

21. The method of claim 19 which further comprises, after attaching the sealable top cover to seal the valve box, either (1) introducing pressurization gas into the sealed valve box or (2) introducing purge gas into the sealed valve box and withdrawing purge gas from the sealed valve box.

* * * * *